United States Patent
Dou et al.

(10) Patent No.: US 10,771,230 B2
(45) Date of Patent: Sep. 8, 2020

(54) ESTIMATING APPARATUS FOR BIAS DRIFT OF TRANSMITTING END MODULATOR, COMPENSATING APPARATUS AND RECEIVER

(71) Applicant: FUJITSU LIMITED, Kawasaki (JP)

(72) Inventors: Liang Dou, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 2 days.

(21) Appl. No.: 15/291,141

(22) Filed: Oct. 12, 2016

(65) Prior Publication Data

US 2017/0104577 A1    Apr. 13, 2017

(30) Foreign Application Priority Data

Oct. 12, 2015  (CN) .......................... 2015 1 0659083

(51) Int. Cl.
  *H04B 10/00*    (2013.01)
  *H04L 7/00*     (2006.01)
  (Continued)

(52) U.S. Cl.
  CPC ........ *H04L 7/0075* (2013.01); *H04L 27/0014* (2013.01); *H04L 27/26* (2013.01)

(58) Field of Classification Search
  USPC .................... 398/147, 149, 152, 159, 162
  See application file for complete search history.

(56) References Cited

U.S. PATENT DOCUMENTS 5,717,510 A * 2/1998 Ishikawa ............ H04B 10/0795
                                                    398/147
5,953,139 A * 9/1999 Nemecek ................. H04N 7/22
                                                    348/E7.094

(Continued)

FOREIGN PATENT DOCUMENTS

CN      1655640       8/2005
CN    101453435       6/2009

(Continued)

OTHER PUBLICATIONS

Liang Dou, "Electronic Pre-Distortion Operating at 1 Sample/symbol with Accurate Bias Control for CD Compensation ", Mar. 25, 2010, OSA, All pages.*

(Continued)

*Primary Examiner* — David C Payne
*Assistant Examiner* — Pranesh K Barua
(74) *Attorney, Agent, or Firm* — Staas & Halsey LLP

(57) ABSTRACT

An estimating apparatus for bias drift of a transmitting end modulator, a compensating apparatus, a receiver and a method are disclosed. Estimation and compensation of the bias drift are performed directly at the receiving end according to phase recovered received signals, with no need of providing an extra bias control circuit at the transmitting end. Estimating and compensating for the bias drift includes recovering received signals by removing a frequency difference and a phase difference between a transmitting end laser and a receiving end laser producing phase recovered received signals, estimating the bias drift of the transmitting end modulator according to the phase recovered received signals and compensating the bias drift of the transmitting end modulator in a receiver.

8 Claims, 7 Drawing Sheets

(51) Int. Cl.
*H04L 27/26* (2006.01)
*H04L 27/00* (2006.01)

(56) References Cited

U.S. PATENT DOCUMENTS

| | | | | |
|---|---|---|---|---|
| 6,889,347 | B1* | 5/2005 | Adams | H04B 10/07953 398/147 |
| 7,899,340 | B1* | 3/2011 | Bontu | H04B 10/60 398/203 |
| 8,731,413 | B1* | 5/2014 | Dave | H04B 10/25137 398/202 |
| 2001/0021051 | A1* | 9/2001 | Kim | H04B 10/564 398/147 |
| 2002/0063934 | A1* | 5/2002 | Sakauchi | H04B 10/2513 398/141 |
| 2004/0131365 | A1* | 7/2004 | Lee | H04B 10/504 398/197 |
| 2005/0186924 | A1 | 8/2005 | Hur | |
| 2005/0281324 | A1* | 12/2005 | Wallen | H04L 1/20 375/148 |
| 2006/0228121 | A1* | 10/2006 | Tolliver | H04B 10/0799 398/198 |
| 2007/0177882 | A1* | 8/2007 | Akiyama | G02F 1/2255 398/185 |
| 2008/0145066 | A1* | 6/2008 | Hoshida | H04B 10/63 398/205 |
| 2008/0298810 | A1* | 12/2008 | Crosby | H04B 10/672 398/135 |
| 2009/0060508 | A1* | 3/2009 | Tanimura | H04B 10/5561 398/65 |
| 2009/0226186 | A1* | 9/2009 | Roman | H04B 10/677 398/202 |
| 2010/0014874 | A1* | 1/2010 | Kawanishi | H04B 10/5563 398/187 |
| 2010/0239267 | A1* | 9/2010 | Kikuchi | H04L 27/2096 398/156 |
| 2010/0303474 | A1* | 12/2010 | Nakashima | H04B 10/6165 398/210 |
| 2011/0293287 | A1* | 12/2011 | Fukuchi | H04B 10/25133 398/147 |
| 2012/0014699 | A1* | 1/2012 | Curt | H04B 10/2507 398/209 |
| 2012/0039618 | A1 | 2/2012 | Mamyshev et al. | |
| 2013/0045008 | A1* | 2/2013 | Miyazaki | G01R 29/0871 398/38 |
| 2014/0023368 | A1* | 1/2014 | Bhandare | 14/6 |
| 2014/0199068 | A1* | 7/2014 | Kaneda | H04B 10/614 398/65 |
| 2015/0050030 | A1* | 2/2015 | Le Taillandier De Gabory | H04B 10/564 398/183 |
| 2015/0086216 | A1* | 3/2015 | Xie | H04B 10/0795 398/186 |
| 2015/0318921 | A1* | 11/2015 | Zhao | H04B 10/0795 398/25 |
| 2016/0036533 | A1* | 2/2016 | Nakashima | G02F 1/2255 398/187 |
| 2016/0099782 | A1* | 4/2016 | Kuang | H04B 10/6161 398/136 |
| 2016/0173304 | A1* | 6/2016 | Le Taillandier De Gabory | H04L 25/06 398/76 |
| 2016/0248609 | A1* | 8/2016 | Schaefer | G02F 1/0123 |
| 2017/0054511 | A1* | 2/2017 | Bianciotto | H04B 10/588 |

FOREIGN PATENT DOCUMENTS

| | | | |
|---|---|---|---|
| CN | 103168437 | 6/2013 | |
| CN | 104144018 | 11/2014 | |
| CN | 104202731 | 12/2014 | |
| JP | 2015-5803 | 1/2015 | |
| JP | 2016-208257 | 12/2016 | |
| WO | 2015/015533 | 2/2015 | |
| WO | WO-2015154962 A1 * | 10/2015 | H04B 10/6165 |

OTHER PUBLICATIONS

Chinese Office Action dated Jan. 21, 2019 in Chinese Patent Application No. 201510659083.X.
Chinese Office Action dated Aug. 21, 2019 in Chinese Patent Application No. 201510659083.X.
Japanese Office Action dated Jun. 30, 2020 in Japanese Patent Application No. 2016-199048 X.

* cited by examiner

ESTIMATING APPARATUS FOR BIAS DRIFT OF TRANSMITTING END MODULATOR, COMPENSATING APPARATUS AND RECEIVER

CROSS-REFERENCE TO RELATED APPLICATIONS

This application claims the priority benefit of Chinese Patent Application No. 201510659083.X filed on Oct. 12, 2015 in the Chinese State Intellectual Property Office, the disclosure of which is incorporated herein in its entirety by reference.

BACKGROUND

1. Field

The present disclosure relates to the field of communications, and in particular to an estimating apparatus for bias drift of a transmitting end modulator, a compensating apparatus and a receiver, and a method.

2. Description of the Related Art

In a high-speed optical communications system, it is generally needed to provide a modulator at a transmitting end to modulate transmission signals, and a vector modulator is widely used. The vector modulator may move spectra of an electrical domain to near optical frequencies with almost no loss, to achieve a high spectral utilization in combination with a coherent monitor technology at a receiver end.

In practical use, in order that a modulator operates normally, a bias voltage of the modulator needs to be accurately set. However, due to such factors as an ambient temperature, and laser central wavelength drift, etc., normal bias points of the modulator cannot be accurately guaranteed, hence, bias drift occurs. For special modulation signals, such as quadrature phase shift keying (QPSK) or quadrature amplitude modulation (QAM), a bias control circuit may be provided at the transmitting end, to compensate for the bias drift.

It should be noted that the above description of the background is merely provided for clear and complete explanation of the present disclosure and for easy understanding by those skilled in the art. And it should not be understood that the above technical solution is known to those skilled in the art because it is described in the background of the present disclosure.

SUMMARY

Additional aspects and/or advantages will be set forth in part in the description which follows and, in part, will be apparent from the description, or may be learned by practice of the embodiments.

When the above method is used to control the bias points of the modulator, as an extra bias control circuit needs to be provided at the transmitting end. This will result in a structure of the system being complex. And for other modulation formats, such as frequency division multiplexing (FDM) or orthogonal frequency division multiplexing (OFDM), the effect of the bias control circuit is not ideal. Furthermore, the precision of the control of the bias points by the bias control circuit is unable to meet demands of high-order modulation formats.

Embodiments of the present disclosure provide an estimating apparatus for bias drift of a transmitting end modulator, a compensating apparatus and a receiver, and a method, in which estimation and compensation of the bias drift are performed directly at the receiving end according to phase recovered received signals, with no need of providing an extra bias control circuit at the transmitting end, which makes the system simple in structure, and is applicable to various modulation formats, with a wide range of applicability, and may meet demands of high-order modulation formats; and furthermore, it may be used simultaneously with a bias control circuit of an existing transmitter, thereby further improving precision of estimation and compensation of the bias drift.

According to a first aspect of the embodiments of the present disclosure, there is provided an estimating apparatus for bias drift of a transmitting end modulator, including: a recovering unit configured to perform phase recovery on received signals, to remove a frequency difference and a phase difference between a transmitting end laser and a receiving end laser; and an estimating unit configured to estimate the bias drift of the transmitting end modulator according to phase recovered received signals.

According to a second aspect of the embodiments of the present disclosure, there is provided a compensating apparatus for bias drift of a transmitting end modulator, including: the estimating apparatus as described in the first aspect of the present disclosure; and a third compensating unit configured to compensate for the bias drift of the transmitting end modulator according to estimated bias drift of the transmitting end modulator.

According to a third aspect of the embodiments of the present disclosure, there is provided a receiver, including the estimating apparatus as described in the first aspect of the present disclosure or the compensating apparatus as described in the second aspect of the present disclosure.

An advantage of the embodiments of the present disclosure exists in that estimation and compensation of the bias drift are performed directly at the receiving end according to phase recovered received signals, with no need of providing an extra bias control circuit at the transmitting end, which makes the system simple in structure, and is applicable to various modulation formats, with a wide range of applicability, and may meet demands of high-order modulation formats; and furthermore, it may be used simultaneously with a bias control circuit of an existing transmitter, thereby further improving precision of estimation and compensation of the bias drift.

With reference to the following description and drawings, the particular embodiments of the present disclosure are disclosed in detail, and the principles of the present disclosure and the manners of use are indicated. It should be understood that the scope of embodiments of the present disclosure is not limited thereto. Embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are of some embodiments of the present disclosure only, and a person of ordinary skill in the art may obtain other accompanying drawings according to these accompanying drawings without making an inventive effort. In the drawings.

DETAILED DESCRIPTION

Figure 1:
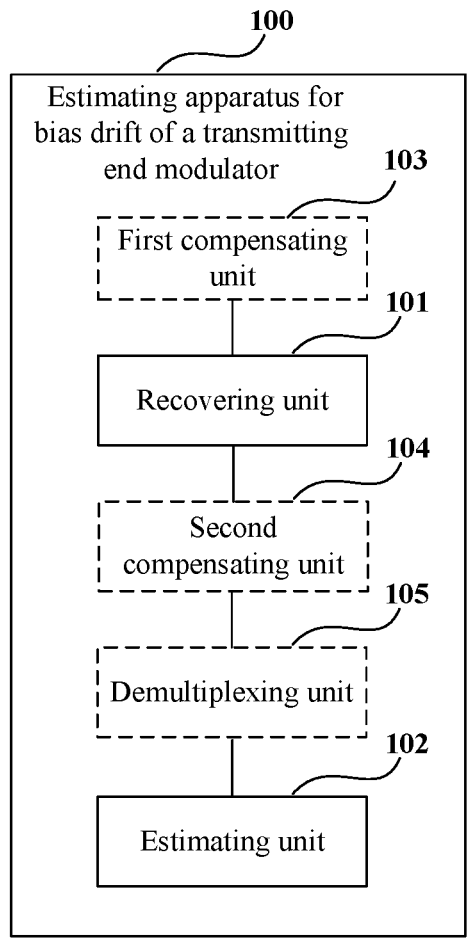
FIG. 1 is a schematic diagram of a structure of the estimating apparatus for bias drift of a transmitting end modulator of Embodiment 1 of the present disclosure.

Reference will now be made in detail to the embodiments, examples of which are illustrated in the accompanying drawings, wherein like reference numerals refer to the like elements throughout. The embodiments are described below to explain by referring to the figures.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

An embodiment of the present disclosure provides an estimating apparatus for bias drift of a transmitting end modulator, applicable to a receiving end of a communications system. FIG. 1 is a schematic diagram of a structure of the estimating apparatus for bias drift of a transmitting end modulator of Embodiment 1 of the present disclosure. As shown in FIG. 1, the apparatus 100 includes:

a recovering unit 101 configured to perform phase recovery on received signals, to remove a frequency difference and a phase difference between a transmitting end laser and a receiving end laser; and an estimating unit 102 configured to estimate the bias drift of the transmitting end modulator according to phase recovered received signals.

It can be seen from the above embodiment that estimation and compensation of the bias drift are performed directly at the receiving end according to phase recovered received signals, with no need of providing an extra bias control circuit at the transmitting end, which makes the system simple in structure, and is applicable to various modulation formats, with a wide range of applicability, and may meet demands of high-order modulation formats; and furthermore, it may be used simultaneously with a bias control circuit of an existing transmitter, thereby further improving precision of estimation and compensation of the bias drift.

In this embodiment, the received signals refer to signals in an optical communications system transmitted from a transmitting end and received in a receiving end after passing a transmission link.

In this embodiment, description shall be given taking that a vector modulator is used at the transmitting end as an example.

Figure 2:
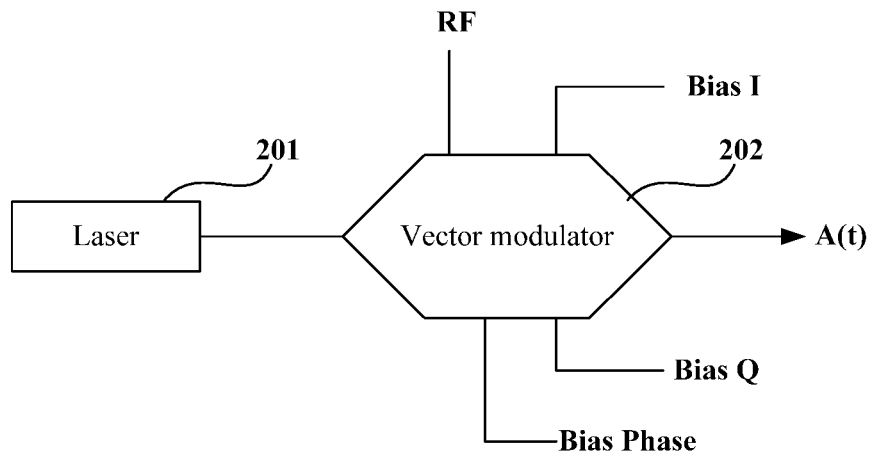
FIG. 2 is a schematic diagram of a structure of the transmitting end modulator of Embodiment 1 of the present disclosure.

FIG. 2 is a schematic diagram of a structure of the transmitting end modulator of Embodiment 1 of the present disclosure. As shown in FIG. 2, a transmission signal A(t) is formed from light emitted from a laser 201 and modulated by a vector modulator 202, the vector modulator 202 being provided with three bias points, a real part bias point Bias I, an imaginary part bias point Bias Q, and a phase bias point Bias Phase; and furthermore, radio frequency input RF is further provided.

After a period of time of operation of the laser 201 and the vector modulator 202, as a change of the ambient temperature and drift of a central wavelength of the laser, and drift occurs in the bias points of the vector modulator 202, a direct current signal is generated in a real part or an imaginary part of the transmission signal, which results in an imbalance of amplitudes of the real part signal and the imaginary part signal, and further result in an extra phase difference between the real part signal and the imaginary part signal. With the imbalance of amplitudes and the extra phase difference generated between the real part signal and the imaginary part signal, the transmission signal modulated by the vector modulator where bias drift occurs may be expressed by Formula (1) below:

$$A(t)=k_I I(t)+j^* k_Q e^{j\theta} Q(t)+I_0+jQ_0 \quad (1);$$

where, A(t) denotes a transmission signal, t denotes a time, $k_I$ and $k_Q$ respectively denote amplitudes of a real part signal and an imaginary part signal, I(t) and Q(t) respectively denote the real part signal and the imaginary part signal, $I_0$ and $Q_0$ respectively denote a direct current signal generated in the real part signal and the imaginary part signal, and $e^{j\theta}$ denotes a phase difference between the real part signal and the imaginary part signal.

In this embodiment, the bias drift of the vector modulator may include the imbalance $k_I/k_Q$ of the amplitudes of the real part signal and the imaginary part signal, the direct current signal $I_0$ generated in the real part signal, the direct current signal $Q_0$ generated in the imaginary part signal, and the phase difference $\theta$ between the real part signal and the imaginary part signal.

In this embodiment, the recovering unit 101 performs phase recovery on the received signals, to remove the frequency difference and the phase difference between the transmitting end laser and the receiving end laser. The above Formula (1) which expresses the transmission signal may be used to express the phase recovered received signals, that is, the received signals with the frequency difference and the phase difference between the transmitting end laser and the receiving end laser being removed.

A structure of the recovering unit 101 and a method of phase recovery of this embodiment shall be illustrated below.

Figure 3:
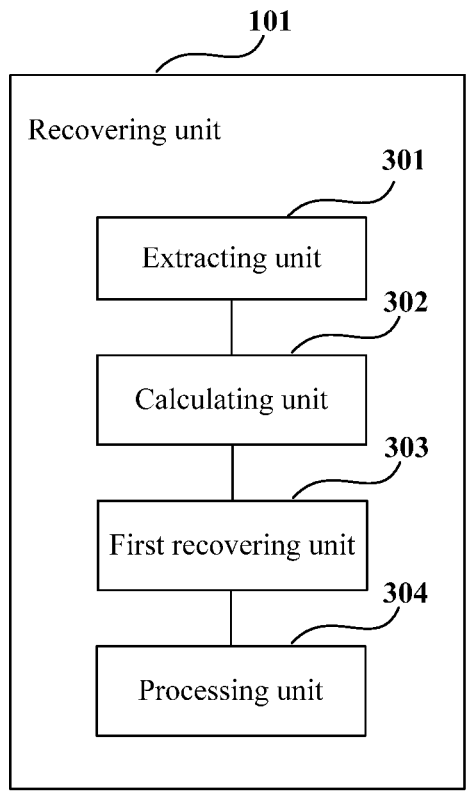
FIG. 3 is a schematic diagram of a structure of the recovering unit of Embodiment 1 of the present disclosure.

FIG. 3 is a schematic diagram of the structure of the recovering unit 101 of Embodiment 1 of the present disclosure. As shown in FIG. 3, the recovering unit 101 includes:

an extracting unit 301 configured to extract pilot signals in the received signals; where the pilot signals are interpolated between neighboring subcarriers at the transmitting end;

a calculating unit 302 configured to calculate laser phase noises in the communications system according to phases of the pilot signals;

a first recovering unit 303 configured to perform carrier phase recovery on the received signals according to the received signals and the laser phase noises; and a processing unit 304 configured to perform down sampling and equalization on the received signals after the first recovering unit 303 performs the carrier phase recovery on the received signals.

Hence, by interpolating the pilot signals between neighboring subcarriers at the transmitting end, calculating the laser phase noises at the receiving end directly according to phases of the pilot signals and performing down sampling and equalization after performing carrier phase recovery on the received signals according to the laser phase noises, it is applicable to a communications system having a high-order modulation format and a receiver having a high sampling rate, and is able to accurately compensate for laser phase noises having wide frequencies, thereby having a relatively powerful carrier phase recovery ability.

The phase recovery of this embodiment is illustrated above. However, this embodiment is not limited thereto, and all phase recovery methods are applicable to this embodiment when they are able to remove the frequency difference and the phase difference between the transmitting end laser and the receiving end laser.

In this embodiment, the estimating unit 102 estimates the bias drift of the transmitting end modulator according to the phase recovered received signals. For example, for the phase recovered received signals that may be expressed by above Formula (1), the following bias drift may be estimated by using an existing method: the imbalance $kI/kQ$ of the amplitudes of the real part signal and the imaginary part signal, the direct current signal $I_0$ generated in the real part signal, the direct current signal $Q_0$ generated in the imaginary part signal, and the phase difference $\theta$ between the real part signal and the imaginary part signal.

For example, $kI/kQ$, $I_0$, $Q_0$ and $\theta$ may be calculated according to the following existing method: a) respectively calculating average values of the real part and the imaginary part of the received signal, and taking them respectively as $I_0$ and $Q_0$; b) calculating a power ratio of the real part and the imaginary part, and obtaining $kI/kQ$ by calculating a root of the power ratio; and c) calculating an average value of the real part multiplied by the imaginary part and an average value of squares of the imaginary part, and obtaining $-\tan(\theta)$ by dividing the former by the latter, hence obtaining the phase difference $\theta$.

In this embodiment, as shown in FIG. 1, the estimating apparatus 100 for bias drift of a transmitting end modulator may further include:

a first compensating unit 103 configured to, before performing the phase recovery on the received signals, compensate for an imbalance between a real part and an imaginary part generated by the received signals at the receiving end. In this embodiment, an existing method may be used for estimation of the imbalance between the real part and the imaginary part generated by the received signals at the receiving end. For example, the imbalance between the real part and the imaginary part may be estimated according to the above existing method, and the received signals may be compensated for according to an estimation result.

In this embodiment, as shown in FIG. 1, the estimating apparatus 100 for bias drift of a transmitting end modulator may further include:

a second compensating unit 104 configured to, before estimating the bias drift of the transmitting end modulator, compensate for dispersion generated by the received signals in a transmission link. In this embodiment, an existing dispersion compensation method may be used.

In this embodiment, as shown in FIG. 1, the estimating apparatus 100 for bias drift of a transmitting end modulator may further include:

a demultiplexing unit 105 configured to demultiplex the received signals, to obtain received signals in two polarization states;

and the estimating unit 101 estimates respectively the bias drift of the transmitting end modulator according to the received signals in the two polarization states.

In this embodiment, for a polarization multiplexing system, the demultiplexing unit 105 may be used to demultiplex the received signals, to obtain the received signals in the two polarization states. For example, the pilot signals interpolated into the transmission signals may be used to perform the demultiplexing, a training sequence at the transmitting end may be used to perform the demultiplexing, or a decision-based adaptive method may be used to perform the demultiplexing.

In this embodiment, the first compensating unit 103, the second compensating unit 104 and the demultiplexing unit 105 are optional, and are shown by dashed boxes in FIG. 1.

It can be seen from the above embodiment that estimation and compensation of the bias drift are performed directly at the receiving end according to phase recovered received signals, with no need of providing an extra bias control circuit at the transmitting end, which makes the system simple in structure, and is applicable to various modulation formats, with a wide range of applicability, and may meet demands of high-order modulation formats; and furthermore, it may be used simultaneously with a bias control circuit of an existing transmitter, thereby further improving precision of estimation and compensation of the bias drift.

Embodiment 2

Figure 4:
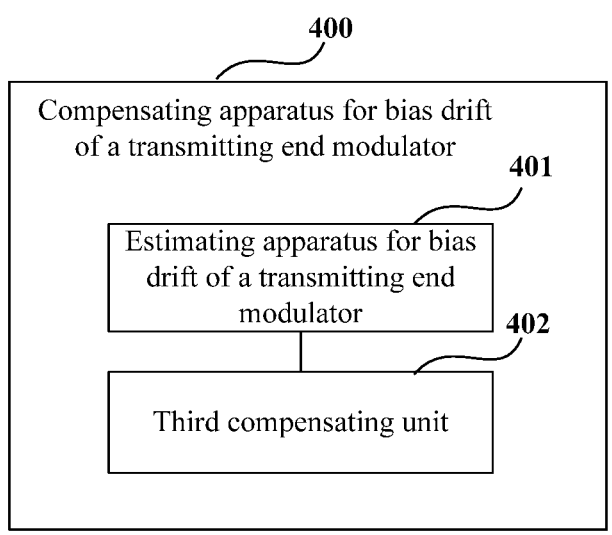
FIG. 4 is a schematic diagram of a structure of the compensating apparatus for bias drift of a transmitting end modulator of Embodiment 2 of the present disclosure.

An embodiment of the present disclosure further provides a compensating apparatus for bias drift of a transmitting end modulator, which is applicable to a receiving end of a communications system. FIG. 4 is a schematic diagram of a structure of the compensating apparatus for bias drift of a transmitting end modulator of Embodiment 2 of the present disclosure. As shown in FIG. 4, the apparatus 400 includes:

an estimating apparatus 401 for bias drift of a transmitting end modulator; and a third compensating unit 402 configured to compensate for the bias drift of the transmitting end modulator according to estimated bias drift of the transmitting end modulator.

In this embodiment, a structure and functions of the estimating apparatus 401 for bias drift of a transmitting end modulator are identical to those described in Embodiment 1, and shall not be described herein any further.

A structure of the third compensating unit 402 and a method for compensating for the bias drift of the transmitting end modulator of this embodiment shall be illustrated below.

Figure 5:
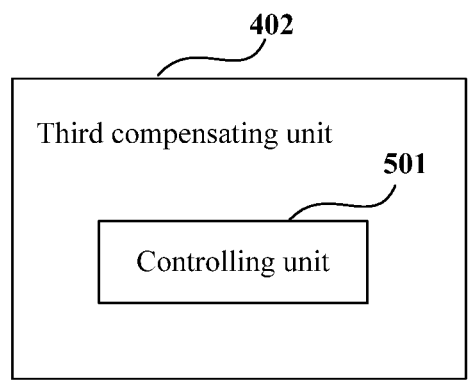
FIG. 5 is a schematic diagram of a structure of the third compensating unit of Embodiment 2 of the present disclosure.

FIG. 5 is a schematic diagram of a structure of the third compensating unit of Embodiment 2 of the present disclosure. As shown in FIG. 5, the third compensating unit 402 includes:

a controlling unit 501 configured to control bias points of the transmitting end modulator according to the estimated bias drift of the transmitting end modulator.

In this embodiment, when the third compensating unit 402 includes the controlling unit 501, the third compensating unit 402 may be arranged at the transmitting end.

Figure 6:
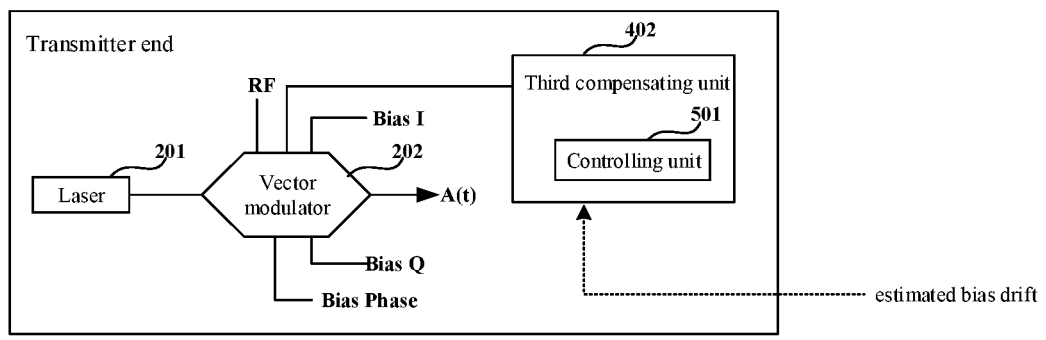
FIG. 6 is a schematic diagram of the controlling of a controlling unit of Embodiment 2 of the present disclosure.

In this embodiment, the controlling unit 501 controls the bias points of the transmitting end modulator according to the estimated bias drift. For example, FIG. 6 is a schematic diagram of the controlling of a controlling unit of Embodiment 2 of the present disclosure, as shown in FIG. 6, the controlling unit 501 is arranged in the transmitting end, the estimated bias drift estimated in the receiving end is feedback to the controlling unit 501 to be taken as a reference value for controlling the bias points, and the bias points are adjusted, so that the re-estimated bias drift gradually becomes small starting from the reference value.

Figure 7:
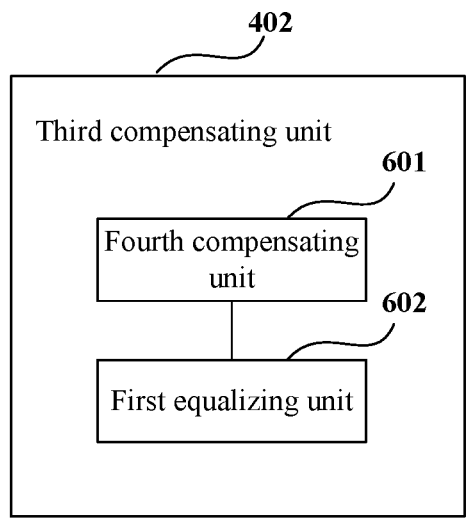
FIG. 7 is another schematic diagram of the structure of the third compensating unit of Embodiment 2 of the present disclosure.

FIG. 7 is another schematic diagram of the structure of the third compensating unit 402 of Embodiment 2 of the present disclosure. As shown in FIG. 7, the third compensating unit 402 includes:

a fourth compensating unit 601 configured to compensate for received signals according to the estimated bias drift of the transmitting end modulator; and a first equalizing unit 602 configured to perform equalization processing on the compensated received signals.

In this embodiment, the fourth compensating unit 601 compensates for the received signals according to the estimated bias drift, such as subtracting an amount of the estimated bias drift from the received signals.

In this embodiment, the first equalizing unit 602 may perform equalization processing on the compensated received signals by using an existing method. For example, a blind equalization algorithm, a decision-based adaptive method and a training sequence-based equalization method, etc., may be used.

Figure 8:
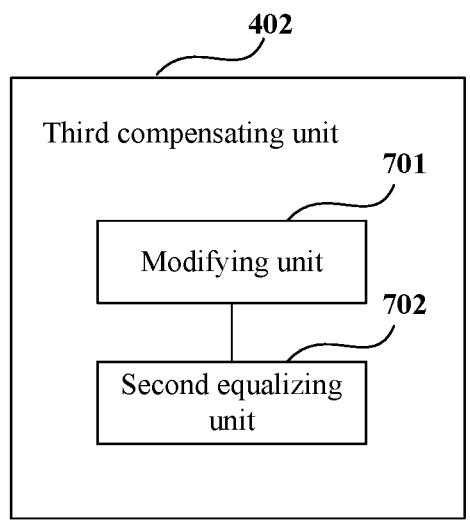
FIG. 8 is a further schematic diagram of a structure of the third compensating unit of Embodiment 2 of the present disclosure.

FIG. 8 is a further schematic diagram of the structure of the third compensating unit 402 of Embodiment 2 of the present disclosure. As shown in FIG. 8, the third compensating unit 402 includes:

a modifying unit 701 configured to modify a reference signal used for performing equalization processing according to the estimated bias drift of the transmitting end modulator; and a second equalizing unit 702 configured to perform equalization processing on the received signals according to a modified reference signal.

In this embodiment, for the decision-based adaptive method and the training sequence-based equalization method, the equalization processing needs to be performed according to a reference signal, and the modifying unit 701 is configured to modify the reference signal according to the estimated bias drift. For example, the reference signal may be modified according to above Formula (1). And the second equalizing unit 702 performs equalization processing on the received signals according to the modified reference signal.

It can be seen from the above embodiment that estimation and compensation of the bias drift are performed directly at the receiving end according to phase recovered received signals, with no need of providing an extra bias control circuit at the transmitting end, which makes the system simple in structure, and is applicable to various modulation formats, with a wide range of applicability, and may meet demands of high-order modulation formats; and furthermore, it may be used simultaneously with a bias control circuit of an existing transmitter, thereby further improving precision of estimation and compensation of the bias drift.

Embodiment 3

Figure 9:
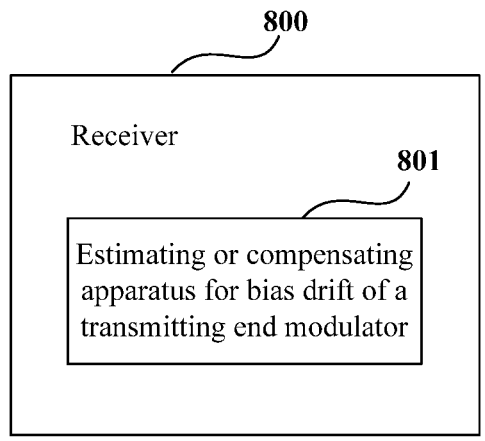
FIG. 9 is a schematic diagram of a structure of the receiver of Embodiment 3 of the present disclosure.

An embodiment of the present disclosure further provides a receiver. FIG. 9 is a schematic diagram of a structure of the receiver of Embodiment 3 of the present disclosure. As shown in FIG. 9, the receiver 800 includes an estimating or compensating apparatus 801 for bias drift of a transmitting end modulator, a structure and functions of the estimating or compensating apparatus 801 being identical to those contained in Embodiment 1 or 2, and being not going to be described herein any further.

Figure 10:
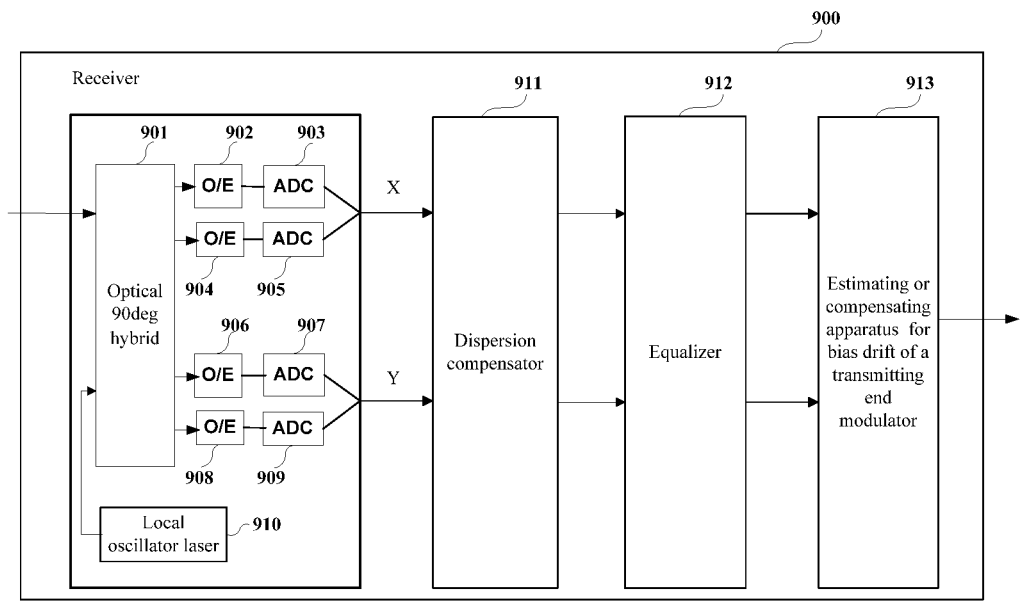
FIG. 10 is a block diagram of a systematic structure of the receiver of Embodiment 3 of the present disclosure.

FIG. 10 is a block diagram of a systematic structure of the receiver of Embodiment 3 of the present disclosure. As shown in FIG. 10, the receiver 900 includes: a front end configured to convert inputted optical signals into baseband signals in two polarization states. In this embodiment, the two polarization states may include an H polarization state and a V polarization state.

As shown in FIG. 10, the front end includes: a local oscillator laser 910, an optical 90 deg hybrid 901, optoelectronic (O/E) detectors 902, 904, 906 and 908, analog-to-digital converters (ADCs) 903, 905, 907 and 909, a dispersion compensator 911, an equalizer 912 and an estimating or compensating apparatus 913 for bias drift of a transmitting end modulator. In this embodiment, a structure and functions of the estimating or compensating apparatus 913 are identical to those described in Embodiment 1 or 2, and shall not be described herein any further; the local oscillator laser 910 is configured to provide a local light source, and optical signals are converted into baseband signals in one polarization state after passing through the optical 90 deg hybrid 901, the optoelectronic (O/E) detectors 902 and 904 and the analog-to-digital converters (ADCs) 903 and 905, and are converted into baseband signals in the other polarization state after passing through the optical 90 deg hybrid 901, the optoelectronic (O/E) detectors 906 and 908 and the analog-to-digital converters (ADCs) 907 and 909; and a particular process of implementation is similar to that in the related art, and shall not be described herein any further.

It can be seen from the above embodiment that estimation and compensation of the bias drift are performed directly at the receiving end according to phase recovered received signals, with no need of providing an extra bias control circuit at the transmitting end, which makes the system simple in structure, and is applicable to various modulation formats, with a wide range of applicability, and may meet demands of high-order modulation formats; and furthermore, it may be used simultaneously with a bias control circuit of an existing transmitter, thereby further improving precision of estimation and compensation of the bias drift.

Embodiment 4

Figure 11:
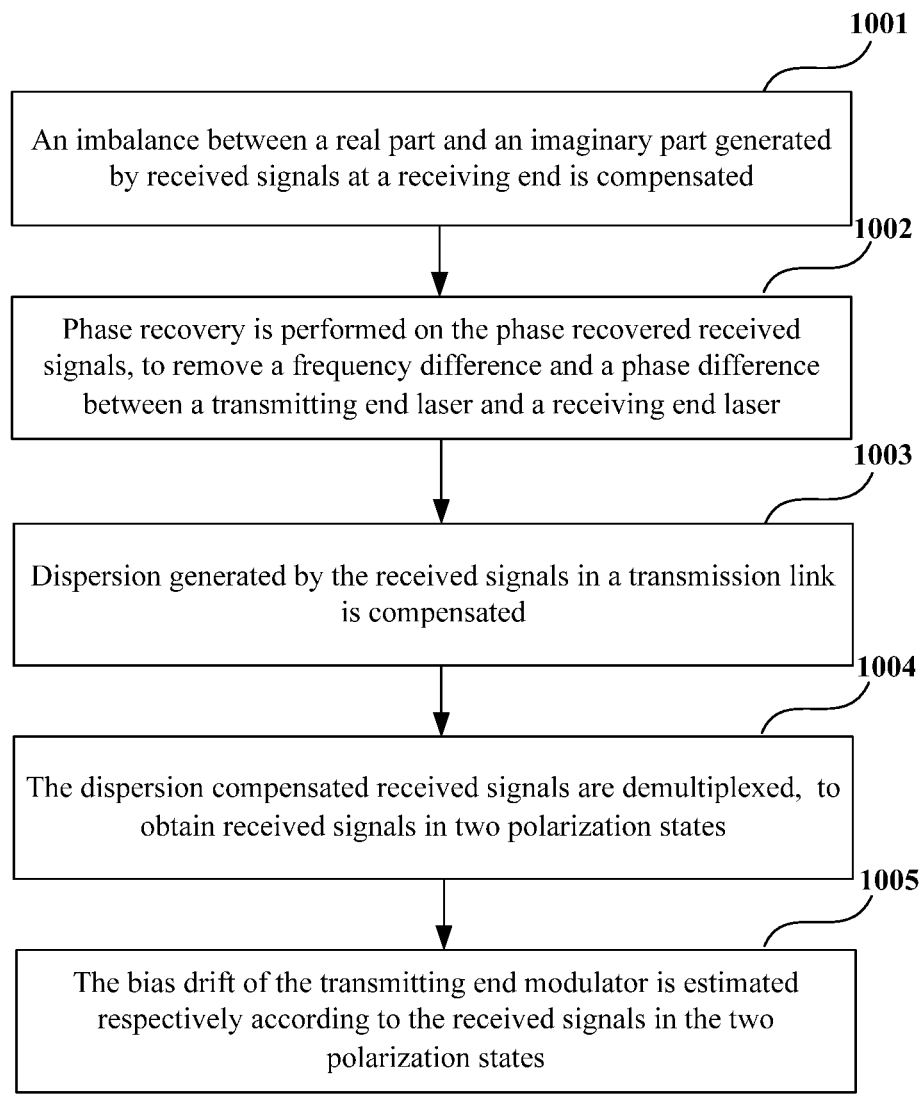
FIG. 11 is a flowchart of the estimating method for bias drift of a transmitting end modulator of Embodiment 4 of the present disclosure.

An embodiment of the present disclosure further provides an estimating method for bias drift of a transmitting end modulator, corresponding to the estimating apparatus for bias drift of a transmitting end modulator of Embodiment 1. FIG. 11 is a flowchart of the estimating method for bias drift of a transmitting end modulator of Embodiment 4 of the present disclosure. As shown in FIG. 11, the method includes:

Step 1001: an imbalance between a real part and an imaginary part generated by received signals at a receiving end is compensated;

Step 1002: phase recovery is performed on the phase recovered received signals, to remove a frequency difference and a phase difference between a transmitting end laser and a receiving end laser;

Step 1003: dispersion generated by the received signals in a transmission link is compensated;

Step 1004: the dispersion compensated received signals are demultiplexed, to obtain received signals in two polarization states; and Step 1005: the bias drift of the transmitting end modulator is estimated respectively according to the received signals in the two polarization states.

In this embodiment, Steps 1001, 1003 and 1004 are optional. And when Steps 1001, 1003 and 1004 are not included, phase recovery is performed directly on the received signals in Step 1002, and the bias drift of the transmitting end modulator are directly estimated according to phase recovered received signals in Step 1005.

In this embodiment, a method for compensating for an imbalance between a real part and an imaginary part generated by received signals at a receiving end, a method for phase recovery, a method for performing dispersion compensation, a method for performing signal demultiplexing and a method for estimating bias drift are identical to those described in Embodiment 1, and shall not be described herein any further.

It can be seen from the above embodiment that estimation and compensation of the bias drift are performed directly at the receiving end according to phase recovered received signals, with no need of providing an extra bias control circuit at the transmitting end, which makes the system simple in structure, and is applicable to various modulation formats, with a wide range of applicability, and may meet demands of high-order modulation formats; and furthermore, it may be used simultaneously with a bias control circuit of an existing transmitter, thereby further improving precision of estimation and compensation of the bias drift.

Embodiment 5

Figure 12:
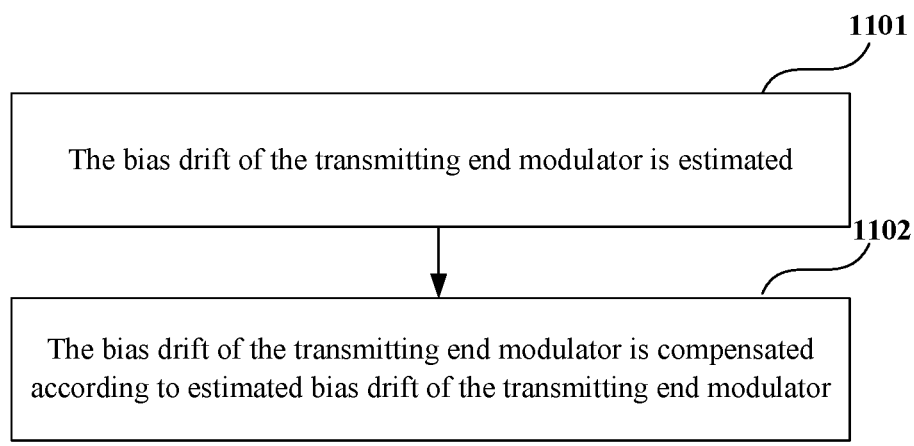
FIG. 12 is a flowchart of the compensating method for bias drift of a transmitting end modulator of Embodiment 5 of the present disclosure.

An embodiment of the present disclosure further provides a compensating method for bias drift of a transmitting end modulator, corresponding to the compensating apparatus for bias drift of a transmitting end modulator of Embodiment 2. FIG. 12 is a flowchart of the compensating method for bias drift of a transmitting end modulator of Embodiment 5 of the present disclosure. As shown in FIG. 12, the method includes:

Step 1101: the bias drift of the transmitting end modulator is estimated; and

Step 1102: the bias drift of the transmitting end modulator is compensated in the receiver according to estimated bias drift of the transmitting end modulator.

In this embodiment, a method for estimating the bias drift of the transmitting end modulator is identical to that described in Embodiment 1 and Embodiment 4, and shall not be described herein any further.

It can be seen from the above embodiment that estimation and compensation of the bias drift are performed directly at the receiving end according to phase recovered received signals, with no need of providing an extra bias control circuit at the transmitting end, which makes the system simple in structure, and is applicable to various modulation formats, with a wide range of applicability, and may meet demands of high-order modulation formats; and furthermore, it may be used simultaneously with a bias control circuit of an existing transmitter, thereby further improving precision of estimation and compensation of the bias drift.

An embodiment of the present disclosure further provides a computer-readable program, when the program is executed in an estimating or compensating apparatus for bias drift of a transmitting end modulator or a receiver, the program enables a computer to carry out the estimating method for bias drift of a transmitting end modulator as described in Embodiment 4 or the compensating method for bias drift of a transmitting end modulator as described in Embodiment 5 in the estimating or compensating apparatus for bias drift of a transmitting end modulator or the receiver.

An embodiment of the present disclosure further provides a storage medium in which a computer readable program is stored, the computer readable program enables a computer to carry out the estimating method for bias drift of a transmitting end modulator as described in Embodiment 4 or the compensating method for bias drift of a transmitting end modulator as described in Embodiment 5 in an estimating or compensating apparatus for bias drift of a transmitting end modulator or a receiver.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

For the implementation containing the above embodiments, following supplements are further disclosed.

Supplement 1. An estimating apparatus for bias drift of a transmitting end modulator, including:
a recovering unit configured to perform phase recovery on received signals, to remove a frequency difference and a phase difference between a transmitting end laser and a receiving end laser; and
an estimating unit configured to estimate the bias drift of the transmitting end modulator according to phase recovered received signals.

Supplement 2. The apparatus according to supplement 1, wherein the apparatus further includes:
a first compensating unit configured to, before performing the phase recovery on the received signals, compensate for an imbalance between a real part and an imaginary part generated by the received signals at the receiving end.

Supplement 3. The apparatus according to supplement 1, wherein the apparatus further includes:
a second compensating unit configured to, before estimating the bias drift of the transmitting end modulator, compensate for dispersion generated by the received signals in a transmission link.

Supplement 4. The apparatus according to supplement 1, wherein the apparatus further includes:
a demultiplexing unit configured to demultiplex the received signals, to obtain received signals in two polarization states; and the estimating unit estimates respectively the bias drift of the transmitting end modulator according to the received signals in the two polarization states.

Supplement 5. A compensating apparatus for bias drift of a transmitting end modulator, including:
the estimating apparatus as supplemented in any one of supplements 1-4; and
a third compensating unit configured to compensate for the bias drift of the transmitting end modulator according to estimated bias drift of the transmitting end modulator.

Supplement 6. The apparatus according to supplement 5, wherein the third compensating unit includes:
a controlling unit configured to control bias points of the transmitting end modulator according to the estimated bias drift of the transmitting end modulator.

Supplement 7. The apparatus according to supplement 5, wherein the third compensating unit includes:
a fourth compensating unit configured to compensate for received signals according to the estimated bias drift of the transmitting end modulator; and
a first equalizing unit configured to perform equalization processing on compensated received signals.

Supplement 8. The apparatus according to supplement 5, wherein the third compensating unit includes:
a modifying unit configured to modify a reference signal used for performing equalization processing according to the estimated bias drift of the transmitting end modulator; and
a second equalizing unit configured to perform equalization processing on the received signals according to a modified reference signal.

Supplement 9. A receiver, including the apparatus as described in any one of supplements 1-8.

Supplement 10. An estimating method for bias drift of a transmitting end modulator, including:
performing phase recovery on received signals, to remove a frequency difference and a phase difference between a transmitting end laser and a receiving end laser; and
estimating the bias drift of the transmitting end modulator according to phase recovered received signals.

Supplement 11. The method according to supplement 10, wherein the method further includes:
before performing the phase recovery on the received signals, compensating for an imbalance between a real part and an imaginary part generated by the received signals at the receiving end.

Supplement 12. The method according to supplement 10, wherein the method further includes:
before estimating the bias drift of the transmitting end modulator, compensating for dispersion generated by the received signals in a transmission link.

Supplement 13. The method according to supplement 10, wherein the method further includes:
demultiplexing the received signals, to obtain received signals in two polarization states;
and the estimating the bias drift of the transmitting end modulator according to phase recovered received signals includes: estimating respectively the bias drift of the transmitting end modulator according to the received signals in the two polarization states.

Supplement 14. A compensating method for bias drift of a transmitting end modulator, including:
the estimating method as described in any one of supplements 10-13; and
compensating for the bias drift of the transmitting end modulator according to estimated bias drift of the transmitting end modulator.

Supplement 15. The method according to supplement 14, wherein the compensating for the bias drift of the transmitting end modulator according to estimated bias drift of the transmitting end modulator includes:
controlling bias points of the transmitting end modulator according to the estimated bias drift of the transmitting end modulator.

Supplement 16. The method according to supplement 14, wherein the compensating for the bias drift of the transmitting end modulator according to estimated bias drift of the transmitting end modulator includes:
compensating for received signals according to the estimated bias drift of the transmitting end modulator; and
performing equalization processing on compensated received signals.

Supplement 17. The method according to supplement 14, wherein the compensating for the bias drift of the transmitting end modulator according to estimated bias drift of the transmitting end modulator includes:
modifying a reference signal used for performing equalization processing according to the estimated bias drift of the transmitting end modulator; and
performing equalization processing on the received signals according to a modified reference signal.

Although a few embodiments have been shown and described, it would be appreciated by those skilled in the art that changes may be made in these embodiments without departing from the principles and spirit of the embodiments, the scope of which is defined in the claims and their equivalents.

What is claimed is:
1. A compensating apparatus, configured in a receiver, for bias drift of a transmitting end modulator, comprising:
a memory that stores a plurality of instructions; and
a processor coupled to the memory and the processor configured to:
execute the plurality of instructions to perform phase recovery on received signals, remove a frequency difference and a phase difference between a transmitting end laser and a receiving end laser and produce phase recovered received signals, and estimate the bias drift of the transmitting end modulator contained in the received signals according to the phase recovered received signals, compensate for the bias drift of the transmitting end modulator according to the estimated bias drift of the transmitting end modulator, wherein the processor is further configured to modify a reference signal used for performing equalization processing according to the estimated bias drift of the transmitting end modulator, and perform equalization processing on the received signals according to the modified reference signal.

2. The compensating apparatus according to claim 1, wherein the processor is further configured to, before performing the phase recovery on the received signals, compensate for an imbalance between a real part and an imaginary part generated by the received signals at the receiving end.

3. The compensating apparatus according to claim 1, wherein the processor is further configured to, before estimating the bias drift of the transmitting end modulator, compensate for dispersion generated in the received signals in a transmission link.

4. The compensating apparatus according to claim 1, wherein the processor is further configured to demultiplex the received signals, to obtain polarized received signals in two polarization states; and estimates respectively the bias drift of the transmitting end modulator according to the polarized received signals in the two polarization states.

5. The compensating apparatus according to claim 1, wherein the processor is further configured to control bias points of the transmitting end modulator according to the estimated bias drift of the transmitting end modulator.

6. The compensating apparatus according to claim 1, wherein the processor is further configured to compensate the received signals for bias drift according to the estimated bias drift of the transmitting end modulator; and perform equalization processing on the compensated received signals.

7. A communication system, comprising:

a transmitting end modulator subject to a bias drift;

a receiver coupled to the transmitting end modulator; and a receiving end compensator performing phase recovery on received signals to remove a frequency difference and a phase difference between a transmitting end laser and a receiving end laser to produce phase recovered received signals, estimate the bias drift according to the phase recovered received signals and to compensate the bias drift of the transmitting end modulator according to the estimated bias drift of the transmitting end modulator in the receiver, the receiving end compensator is further configured to modify a reference signal used for performing equalization processing according to the estimated bias drift of the transmitting end modulator, and perform equalization processing on the received signals according to the modified reference signal.

8. A method of estimating and compensating bias drift of a transmitting end modulator contained in received signals, applied in a receiver, the method comprising:

recovering the received signals by removing a frequency difference and a phase difference between a transmitting end laser and a receiving end laser producing phase recovered received signals;

estimating the bias drift of the transmitting end modulator according to the phase recovered received signals; and compensating the bias drift of the transmitting end modulator in the receiver according to the estimated bias drift of the transmitting end modulator, the method further comprising:

modifying a reference signal used for performing equalization processing according to the estimated bias drift of the transmitting end modulator, and performing equalization processing on the received signals according to the modified reference signal.

* * * * *